Aug. 19, 1952   J. D. RUST   2,607,178
COTTON FLUFFER FOR COTTON PICKING MACHINES
Filed Jan. 12, 1950   2 SHEETS—SHEET 1
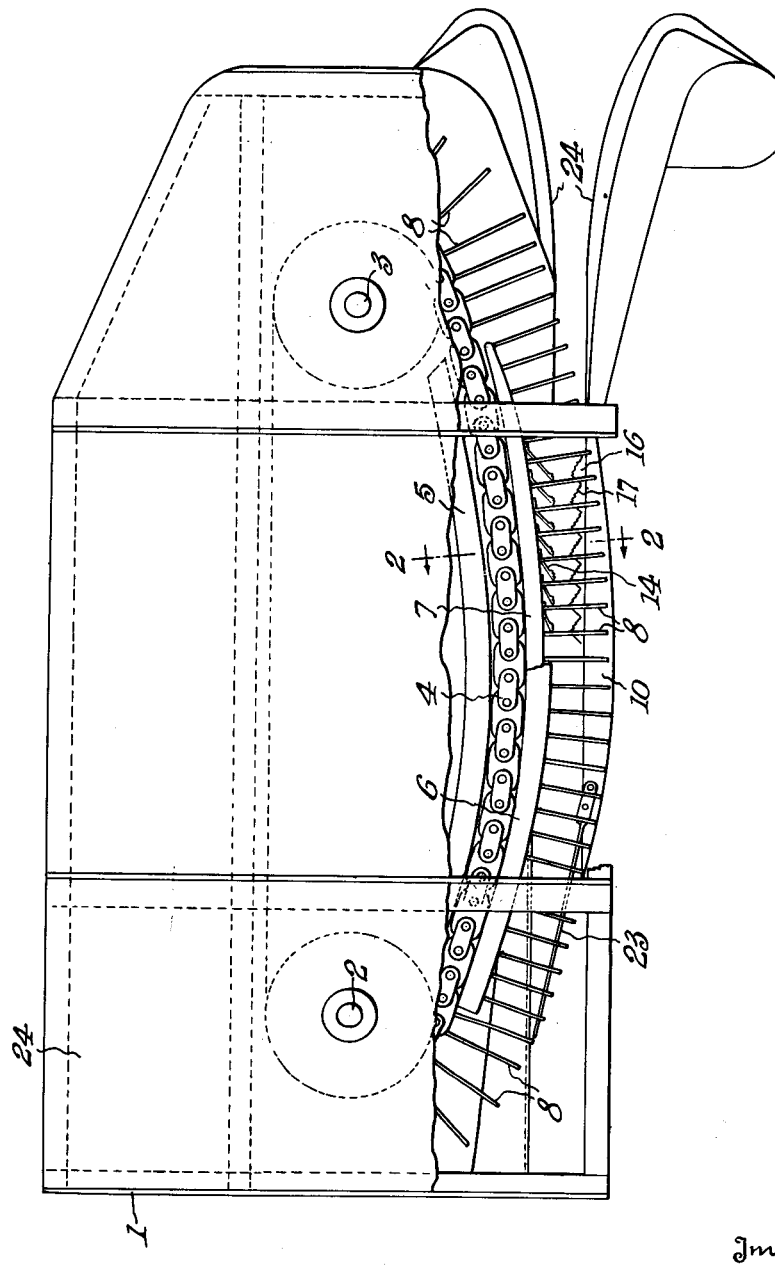
Inventor
John D. Rust
By Albert E. Dieterich,
ATTORNEY

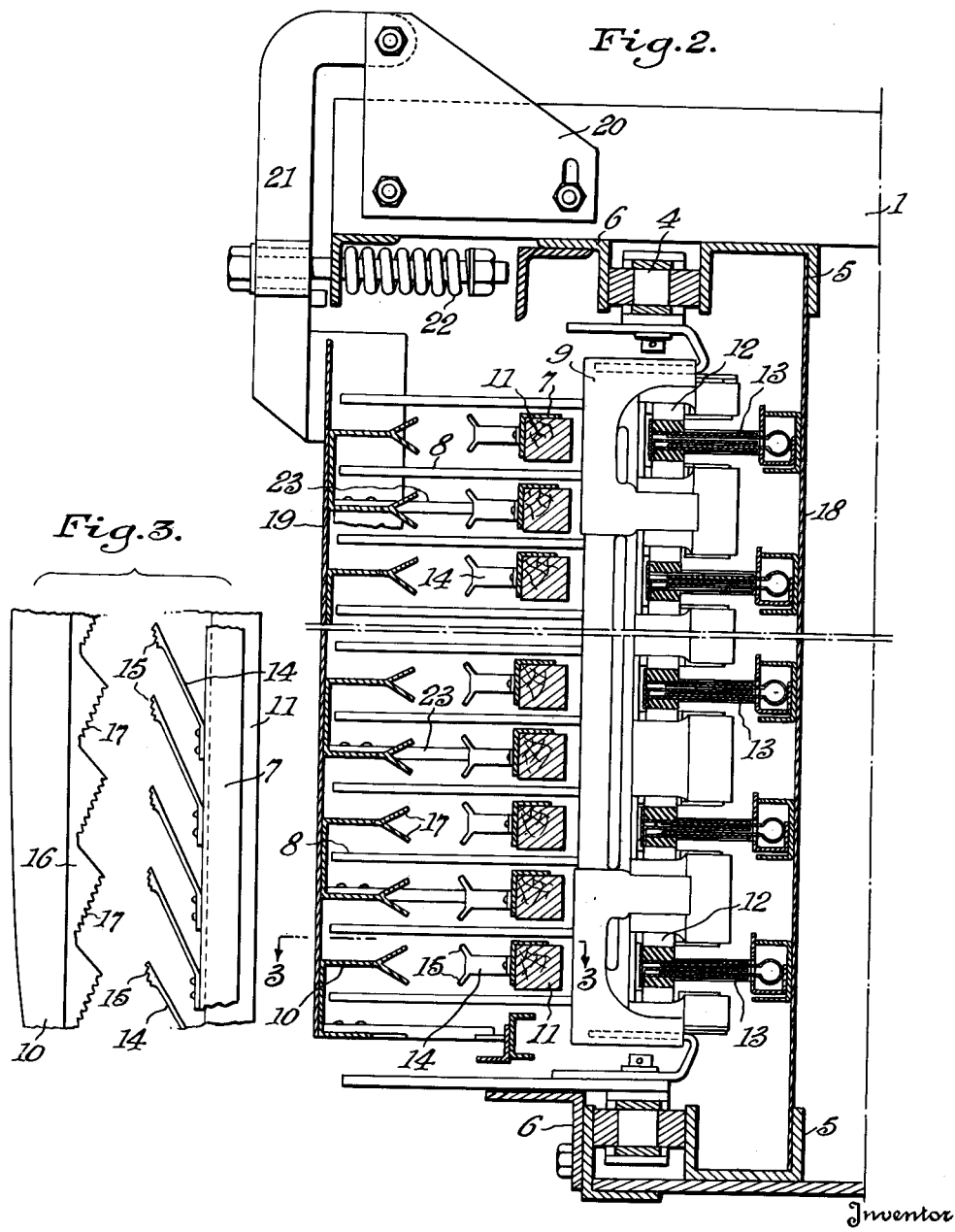

Patented Aug. 19, 1952

2,607,178

UNITED STATES PATENT OFFICE 2,607,178

COTTON FLUFFER FOR COTTON PICKING MACHINES

John D. Rust, Pine Bluff, Ark.

Application January 12, 1950, Serial No. 138,185

8 Claims. (Cl. 56—36)

My present invention relates to cotton picking machines in general, and to the Rust type in particular.

The object of my present invention is to provide means for fluffing the lint of open cotton in the picking tunnel of cotton picking machines, especially of the Rust type.

I have found by experience that the Rust machine in its present form is very effective for picking the open cotton when the lint is fluffy, which is the normal condition of well matured healthy cotton. However, there are conditions where the open cotton is not fluffy and the lint does not readily wind onto the smooth wire spindles even when they are properly moistened. This condition may be caused by boll weevil infestation, "honey-dew," or other adverse conditions.

My present invention is designed to crowd cotton stalks into a narrow passage and to force the open bolls against agitating impediments which serve to fluff the lint and to urge it toward the picking spindles in a manner that will cause the lint to be positively wrapped around the spindles. So far as I know, I am the first to propose a device for this purpose.

To the attainment of the aforesaid objects and ends invention still further resides in the novel details of construction, combination and arrangement of parts, all of which will be first fully described in the following detailed description, and then be particularly pointed out in the appended claims, reference being had to the accompanying drawing, in which:

Fig. 1 is a top plan view of a Rust cotton picker unit of a cotton picking machine, parts being broken away and omitted, showing my invention.

Fig. 2 is a sectional view on an enlarged scale of a cotton picker unit, the section being taken on a plane indicated by line 2—2 of Fig. 1.

Fig. 3 is a detail section on the line 3—3 of Fig. 2.

In the accompanying drawings 1 represents the frame of a Rust cotton picker unit, and 2 and 3 represent the driving and the driven shafts of the endless slatted conveyor 4, the slats 9 of which carry the picking spindles 8. Tracks 5 and 6 guide the conveyor in its course.

The slats may be of any desired construction, but preferably are of the construction disclosed in my Patent No. 2,440,450, issued April 27, 1948.

7 designates the usual stalk guards which are secured to a vertically disposed frame member, not shown, at the rear of the unit. Wear blocks 11 are secured to the inner side of the stalk guards 7 to prevent metallic contact between said stalk guards and the spindle slats 9.

Stalk crowder fins 10 are carried by an outer wall 19 mounted on an arm 21 pivoted to bracket 20 mounted on the frame 1. The wall 19 is held in its proper place by a suitable spring device 22.

12 indicates the spindle drive-rollers which run on tracks of the spindle operating units 13 carried on a wall 18.

All of the foregoing parts are of known construction and, per se, are not a part of my present invention. Therefore they are not herein described in detail.

My present invention involves the locating in the tunnel 24 of means for fluffing the cotton in the bolls as the machine passes over the plants. Said means includes resilient arms or fluffers 14 having fingers 15 to engage the cotton. These arms are secured to the stalk guards 7 and are inclined rearwardly-laterally from the same.

Secured in any suitable way, as by welding for example, to the stalk crowder fins 10 are other fluffers 16 having inclined surfaces formed with serrated edges 17 which project into the path of the plants in the tunnel to engage and fluff the cotton carried by the bolls.

23 designates flexible (resilient) steel rods for crowding the plants in a direction toward the conveyor which adds to the picking efficiency under certain conditions.

As will be seen by reference to Fig. 2, the fluffers 14 and 16 are not located in the paths of the spindles, but are located between the same in positions so as to be engaged by the cotton bolls as the machine travels along the rows of plants, thereby fluffing the lint in a manner to cause the lint to be positively wrapped around the spindles.

It is necessary to have the fluffers, at one side of the tunnel at least, yieldable in order to let large stalks pass without clogging the tunnel, and at the same time to extend close enough to the opposite agitators to insure contact with all open bolls under ordinary conditions.

The fingers 15 (constituting the tips of the arms 14) are composed either of rubber or steel, as desired. Rubber tips are desirable when picking cotton having many green bolls, but after the cotton is practically all open steel tips will serve equally as well. The aim is to thoroughly fluff the cotton in the front part of the picking tunnel and then to leave the spindles free to finish wrapping it up from about half-way back.

From the foregoing description, taken in connection with the accompanying drawings, it is thought that the construction, operation and ad-

What I claim is:

1. In a cotton picking machine having a tunnel through which cotton plants are passed and having picking spindles to enter the cotton plants within the tunnel, said machine having stalk guards at the inner side of the tunnel and stalk crowder at the outer side of the tunnel, the guards at the inner side being rigid and the crowder at the outer side being yieldably mounted, in combination with cotton fluffing elements located within the tunnel and mounted on said stalk guards and crowder, the fluffing elements mounted on the guards being resilient.

2. In a cotton picking machine having a tunnel through which cotton plants are passed and having picking spindles to enter the cotton plants within the tunnel, said machine having stalk guards at the inner side of the tunnel and stalk crowder at the outer side of the tunnel, the guards at the inner side being rigid and the crowder at the outer side being yieldably mounted, in combination with cotton fluffing elements located within the tunnel and mounted on said stalk guards and crowder, the fluffing elements on the yieldably mounted crowder being rigid.

3. In a cotton picking machine having a tunnel through which cotton plants are passed and having picking spindles to enter the cotton plants within the tunnel, said machine having stalk guards at the inner side of the tunnel and stalk crowder at the outer side of the tunnel, the guards at the inner side being rigid and the crowder at the outer side being yieldably mounted, in combination with cotton fluffing elements located within the tunnel and mounted on said stalk guards and crowder, the fluffing elements on the rigid guards being resilient and the fluffing elements on the yieldably mounted crowder being rigid.

4. A cotton picking unit having a tunnel for the passage of cotton plants, picking spindles carried by a conveyor and adapted to move through said tunnel for engaging the open cotton bolls on said plants therein, in combination with cotton fluffing members mounted on opposite sides of said tunnel in spaced parallel relation, the fluffing members on one side of said tunnel being rigidly mounted, the fluffing members on the other side of said tunnel being yieldably mounted, the first mentioned fluffing members terminating in roughened fingers.

5. A cotton picking unit having a tunnel for the passage of cotton plants, picking spindles carried by a conveyor and adapted to move through said tunnel for engaging the open cotton bolls on said plants therein, in combination with cotton fluffing members disposed on opposite sides of said tunnel in spaced parallel relation, the fluffing members on one side of said tunnel being rigidly mounted, the fluffing members on the other side of said tunnel being yieldably mounted, the last mentioned fluffing members being formed with a plurality of spaced serrated edges arranged to project into the tunnel for engaging said open cotton bolls.

6. A cotton picking unit having a tunnel for the passage of cotton plants, picking spindles carried by a conveyor and adapted to move through said tunnel for engaging said plants therein, in combination with cotton fluffing members disposed on opposite sides of said tunnel in spaced parallel relation, the fluffing members on one side of said tunnel being rigidly mounted, the fluffing members on the other side of said tunnel being yieldably mounted, said fluffing members being provided with roughened surfaces for engaging the cotton on said plants.

7. A cotton picking unit having a tunnel for the passage of cotton plants, picking spindles carried by a conveyor and adapted to move through said tunnel for engaging the open cotton bolls on said plants therein, in combination with cotton fluffing members disposed on opposite sides of said tunnel in spaced parallel relation, the fluffing members on one side of said tunnel being rigidly mounted, the fluffing members on the other side of said tunnel being yieldably mounted, the first mentioned fluffing members including resilient arms terminating in roughened fingers for engaging said open cotton and the last mentioned fluffing members being formed with a plurality of spaced serrated edges arranged to project into the tunnel for engaging said open cotton.

8. A cotton picking unit having a tunnel for the passage of cotton plants, picking spindles carried by a conveyor and adapted to move through said tunnel for engaging the open cotton bolls on said plants therein, in combination with cotton fluffing members disposed on opposite sides of said tunnel in spaced parallel relation, the fluffing members on one side of said tunnel being rigidly mounted, the fluffing members on the other side of said tunnel being yieldably mounted, the first mentioned fluffing members including resilient arms terminating in roughened fingers for engaging said open cotton and the last mentioned fluffing members including a plurality of spaced serrated surfaces arranged to project into the tunnel for engaging said open cotton, and resilient guide means secured to one side of the tunnel rearwardly of the fluffing members for urging the cotton plants into engagement with said picking spindles.

JOHN D. RUST.

REFERENCES CITED

The following references are of record in the file of this patent:

UNITED STATES PATENTS

| Number | Name | Date |
| --- | --- | --- |
| 1,004,835 | White | Oct. 3, 1911 |
| 1,802,022 | Johnston et al. | Apr. 21, 1931 |
| 2,058,514 | Rust et al. | Oct. 27, 1936 |